United States Patent [19]
de Putter

[11] 3,947,000
[45] Mar. 30, 1976

[54] EXTRUDER DRIVE

[75] Inventor: Warner Jan de Putter, Hardenberg, Netherlands

[73] Assignee: Wavin B.V., Zwolle, Netherlands

[22] Filed: Mar. 6, 1974

[21] Appl. No.: 448,482

[30] Foreign Application Priority Data
Mar. 19, 1973 Netherlands .................... 7303840

[52] U.S. Cl. ............................ 259/192; 259/191
[51] Int. Cl.² ...................................... B29B 1/10
[58] Field of Search ............... 259/191, 192, 193; 74/566 A, 724, 410

[56] References Cited
UNITED STATES PATENTS

| | | | |
|---|---|---|---|
| 1,551,565 | 9/1925 | Hodgkinson | 74/410 |
| 2,386,367 | 10/1945 | Taylor | 74/410 |
| 3,601,859 | 8/1971 | Selbach | 259/6 X |
| 3,665,482 | 5/1972 | Cresswell | 74/410 X |
| 3,682,015 | 8/1972 | Richardson | 74/410 X |
| 3,805,633 | 4/1974 | Bacher | 74/410 |

Primary Examiner—Stanley N. Gilreath
Assistant Examiner—Donald B. Massenberg
Attorney, Agent, or Firm—Wigman & Cohen

[57] ABSTRACT

An extruder for synthetic material with at least two mixing and conveying worms, comprising an extruder housing, an extruder inlet, a driving member for driving one of the worms and a gearing for driving the second worm, said gearing comprising two gear wheels with inclined toothings. These gear wheels are mounted on either side of the mixing and conveying worm and cooperate therewith.

5 Claims, 3 Drawing Figures

U.S. Patent March 30, 1976 3,947,000
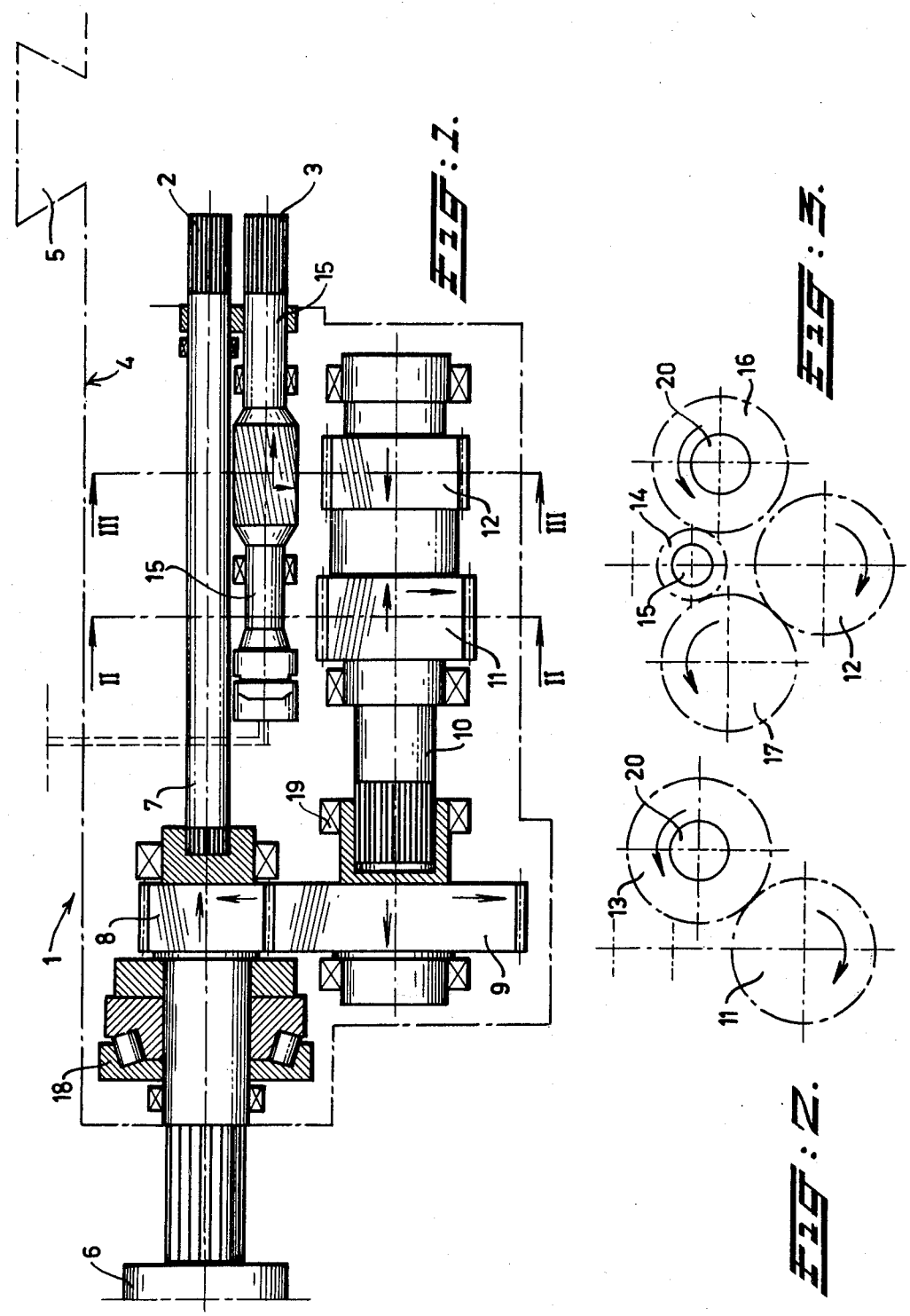

EXTRUDER DRIVE

BACKGROUND OF THE INVENTION

The invention relates to an extruder for synthetic materials with at least two mixing and conveying worms, comprising an extruder housing, an extruder inlet, a driving member for driving one of the worms and a gearing for driving the second worm.

Such extruders are known per se. In these known extruders the shaft of a first mixing and conveying worm is directly driven, while a gear wheel mounted on the shaft of the first mixing and conveying worm drives a gear wheel co-operating therewith and mounted on the driving shaft of the second mixing and conveying worm.

Such a drive suffers from the disadvantage that the two shafts of the mixing and conveying worms are strongly exposed to a bending load.

SUMMARY OF THE INVENTION

The invention aims to provide an extruder for synthetic material of the aforementioned type which does not suffer from the disadvantage as described above and to which in particular a much smaller bending load is applied by using a special type of bearing for the second mixing and conveying worm. Particularly the bending load of the second worm is neutralized.

Finally can be mentioned that the forces acting upon the second mixing and conveying worm in a relating extruder are divided, these two forces having a particular ratio owing to the device's construction.

According to the invention such an extruder with at least two mixing and conveying worms, comprising an extruder housing, an extruder inlet, a driving member for driving one of the worms and a gearing for driving the other worms, is distinguished in that it is provided with a gearing comprising two gear wheels which on either side co-operate with the shaft of the second mixing and conveying worm.

The gearing comprises at least two gear wheels with a convergingly inclined toothing, the gear wheels being mounted on a slidable auxiliary shaft which can be driven and extends substantially parallel to the driving shaft of the other mixing and conveying worm, while a first gear wheel with inclined toothing co-operates with a pinion on the shaft of the other mixing and conveying worm, and the other gear wheel with inclined toothing co-operates with a gearing acting upon the same pinion but on another part thereof than the first gear wheel.

When the two gear wheels with convergingly inclined toothings which are mounted on a slidable auxiliary shaft are operated, this auxiliary shaft can adjust itself to a particular position and thereby limit the bending load of the second mixing and conveying worm shaft to a minimum or almost cancel it.

So as to obtain optimal results the tooth angle ratio for the one gear wheel with inclined toothing should be selected such that it can exert the same force on the pinion as the second gear wheel. As mentioned before, both gear wheels with inclined toothing are mounted on a slidable shaft. In the above case almost parallel, but opposite forces are exerted on the shaft of the second mixing and conveying worm, whereby a bending load is hardly or not at all, applied to the second worm shaft.

SURVEY OF THE DRAWINGS

FIG. 1 is a vertical sectional view of an extruder for synthetic material according to the invention, portions of the power transmission thereof being eliminated for purposes of clarity;

FIG. 2 represents a schematic view taken on line II—II of FIG. 1, the power transmission train being illustrated in phantom, and FIG. 3 represents a schematic view taken on line III—III of FIG. 1, the power transmission train being illustrated in phantom.

DESCRIPTION OF PREFERRED EMBODIMENTS

In the Figure an extruder 1, for synthetic material is shown with at least two mixing and conveying worms 2 and 3, the extruder comprising an extruder housing 4 and an extruder inlet 5.

A driving member 6 such as a motor is disposed which drives the shaft 7 of the first mixing and conveying worm 2. On this shaft 7 is mounted a gear wheel 8 which can co-operate with a gear wheel 9 provided on an auxiliary shaft 10. This auxiliary shaft 10 is slidably mounted in a bearing 19. The auxiliary shaft 10 carries a first gear wheel with inclined toothing 11 and, spaced therefrom, a second gear wheel with inclined toothing 12, the tooth angle of the first gear wheel with inclined toothing 11 being opposite to the tooth angle of the gear wheel with inclined toothing 12. The gear wheel with inclined toothing 11 co-operates with a gear wheel 13 on a second auxiliary shaft 20 which carries a third gear wheel 16 which in turn drives a pinion 14 mounted on a worm shaft 15. The gear wheel with inclined toothing 12 likewise drives the pinion 14 on the other side of the worm shaft 15 by means of a gear wheel 17.

The gear wheels 16 and 17 which are driven by the two gear wheels with inclined toothing 11, 12 are situated on either side of the worm shaft 15.

Due to the fact that auxiliary shaft 10 cannot absorb axial forces and the toothings on the gear wheels 11 and 12 are inclined with respect to this shaft, the gear wheels 11 and 12 each exert an axial force on shaft 10, the forces balancing each other. In view of the fixed ratio between the tangential and the axial force in a gear wheel with inclined toothing 11, 12 there is also a fixed ratio between the tangential forces on the gear wheels 11 and 12, this ratio depending on the ratio of the tooth angles and the transmission ratios. Starting from the fact that the total transmission ratio from 12 to 14 should be equal to that from 11 to 14 and that the force exerted by the wheel 16 on wheel 14 should be equal to the force exerted by 17 on 14 and supposing that:

$\alpha$ = tooth angle of gear wheel 12 (and 17, 16 and 14)
$\beta$ = tooth angle of gear wheel 11 (and 13)
then it holds that tg$\alpha$ = $\phi$ 12 / $\phi$ 11 = $\phi$ 16 / $\phi$ 13 and tooth force 12/ tooth force 11 = $\phi$ 12/ $\phi$ 11.

Since these forces are almost parallel but contrary, a bending load is hardly or not at all applied to the second worm shaft of the second mixing and conveying worm 3. A bending load would wholly fail to be applied when gear wheel 17 and gear wheel 16 are diametrically disposed and co-operating with the pinion 14.

Due to suitable selection of the ratio of the tooth angles it is moreover possible to distribute the forces in an adjustable way while the driving moments too, can be adjusted in a regulable way.

A special advantage consists in that, by using a first transmission from gear wheel 8 to gear wheel 9 and two second transmissions from wheel 11 to pinion 14 and from wheel 12 to pinion 14, one has not to keep to the transmission ratio 1 : 1 for each of these transmissions.

A further advantage is that in an extruder as described above the driving shaft of the second mixing and conveying worm 3 is driven on two sides whereby an optimal adjustment of the second mixing and conveying worm 3 is obtained and a bending load is hardly or not at all applied to the second worm shaft.

By means of twin worm extruders of the aforementioned type the consumption of energy is deemed to be considerably reduced when operating with the same quantity of synthetic material.

The axial force of the first mixing and conveying worm 2 is accommodated via an axial bearing 18 of great dimensions.

The second mixing and conveying worm 3 is advantageously supported in a hydrostatic bearing. In such hydrostatic bearings an oil-filled slit is provided between the counter bearing ring and the bearing ring.

What I claim is:

1. In an extruder for synthetic materials comprising an extruder housing having an extruder inlet, two mixing and conveying worms each mounted on a respective shaft, means for directly driving one of the worms and transmission means for driving the second worm; the improvement comprising a first auxiliary shaft associated with said transmission means and disposed substantially parallel to said worm shafts, a first gear wheel mounted on said first auxiliary shaft having gear teeth inclined to the axis thereof which are drivingly connected with a pinion carried by said second worm shaft, a second gear wheel mounted on said first auxiliary shaft having gear teeth inclined to the axis therof at an angle convergingly disposed with respect to the teeth of said first gear wheel and which are drivingly connected with said pinion at a point generally diametrically opposite from the point at which said first gear wheel is drivingly connected thereto, and wherein said first auxiliary shaft is axially slidably mounted whereby it is free to adjust itself axially with respect to said second worm shaft thereby facilitating a substantial canceling of opposite bending loads transmitted to said second worm shaft by said gear wheels.

2. The combination of claim 1, wherein said transmission means includes a second auxiliary shaft extending parallel to said first auxiliary shaft, and wherein said first gear wheel is drivingly connected with said pinion through gear means carried by said second auxiliary shaft.

3. The combination of claim 2, wherein said gear means includes a third gear wheel having gear teeth meshing with the inclined gear teeth of said first gear wheel, and wherein said gear means further includes a fourth gear wheel having teeth meshing with said pinion.

4. The combination of claim 3, wherein said second gear wheel is drivingly connected with said pinion through a fourth gear wheel having teeth meshing with said pinion along a line contact disposed on an opposite side of an axial plane extending through said pinion from a line contact along which said third gear wheel teeth mesh with said pinion.

5. The combination of claim 1, wherein the ratio of the tooth angles of said first and second gear wheels is selected such the oppositely directed forces trnsmitted therethrough to said second worm shaft are substantially equal and parallel thereby limiting the bending load applied thereto.

\* \* \* \* \*